United States Patent [19]
Schopfer et al.

[11] Patent Number: 5,636,273
[45] Date of Patent: Jun. 3, 1997

[54] INTEGRATED RING DETECTION CIRCUIT AND POWER CROSS DETECTION CIRCUIT WITH PERSISTENCE TIMERS

[76] Inventors: Walter S. Schopfer, 2727 Barton Skyway, Austin, Tex. 78704; Sergio R. Ramirez, 7810 Callbram La., Austin, Tex. 78736

[21] Appl. No.: 483,868

[22] Filed: Jun. 7, 1995

[51] Int. Cl.$^6$ ...................... H04M 3/02
[52] U.S. Cl. .............. 379/412; 379/252; 379/377; 379/382
[58] Field of Search ............... 379/412, 413, 379/373, 377, 382, 30, 418, 252

[56] References Cited

U.S. PATENT DOCUMENTS

| | | | |
|---|---|---|---|
| 3,996,426 | 12/1976 | Lancaster | 379/413 |
| 4,079,210 | 3/1978 | Sanderson | 379/382 |
| 4,995,111 | 2/1991 | Tojo et al. | 379/382 |
| 5,038,375 | 8/1991 | Sinberg | 379/398 |
| 5,323,461 | 6/1994 | Rosenbaum et al. | 379/413 |
| 5,426,695 | 6/1995 | Misu | 379/382 |

*Primary Examiner*—Krista M. Zele
*Assistant Examiner*—Jaques M. Saint-Surin
*Attorney, Agent, or Firm*—Foley & Lardner

[57] ABSTRACT

An apparatus for determining a power cross condition during a ringing state of a telephone. The apparatus also is capable of distinguishing a true power cross condition from a short loop ringing condition, by including a first path for receiving a signal indicative of a voltage across a ring feed resistor exceeding a predetermined value, and determining if that voltage is in an active state for a predetermined amount of time (i.e., 14 milliseconds). The apparatus also includes a second path for receiving a first and second current that flow respectively across a first and second sense resistor connected to opposite ends of the ring feed resistor. On the second path, the first and second currents are subtracted, converted to a digital value, filtered, and compared to a threshold value to determine if a ring trip has occurred. If so, the potential ring trip is sent to a persistence timer circuit, for checking if it is in an active state for a predetermined amount of time (i.e., 104 milliseconds). If either of the first and second paths indicate a ring trip, then the apparatus outputs a ring trip detection signal. The apparatus also is configured to work with a power cross validation circuit, which may be connected on a third path for switching ring relays quickly to save components on the telephone lines during a power cross occurrence.

20 Claims, 7 Drawing Sheets

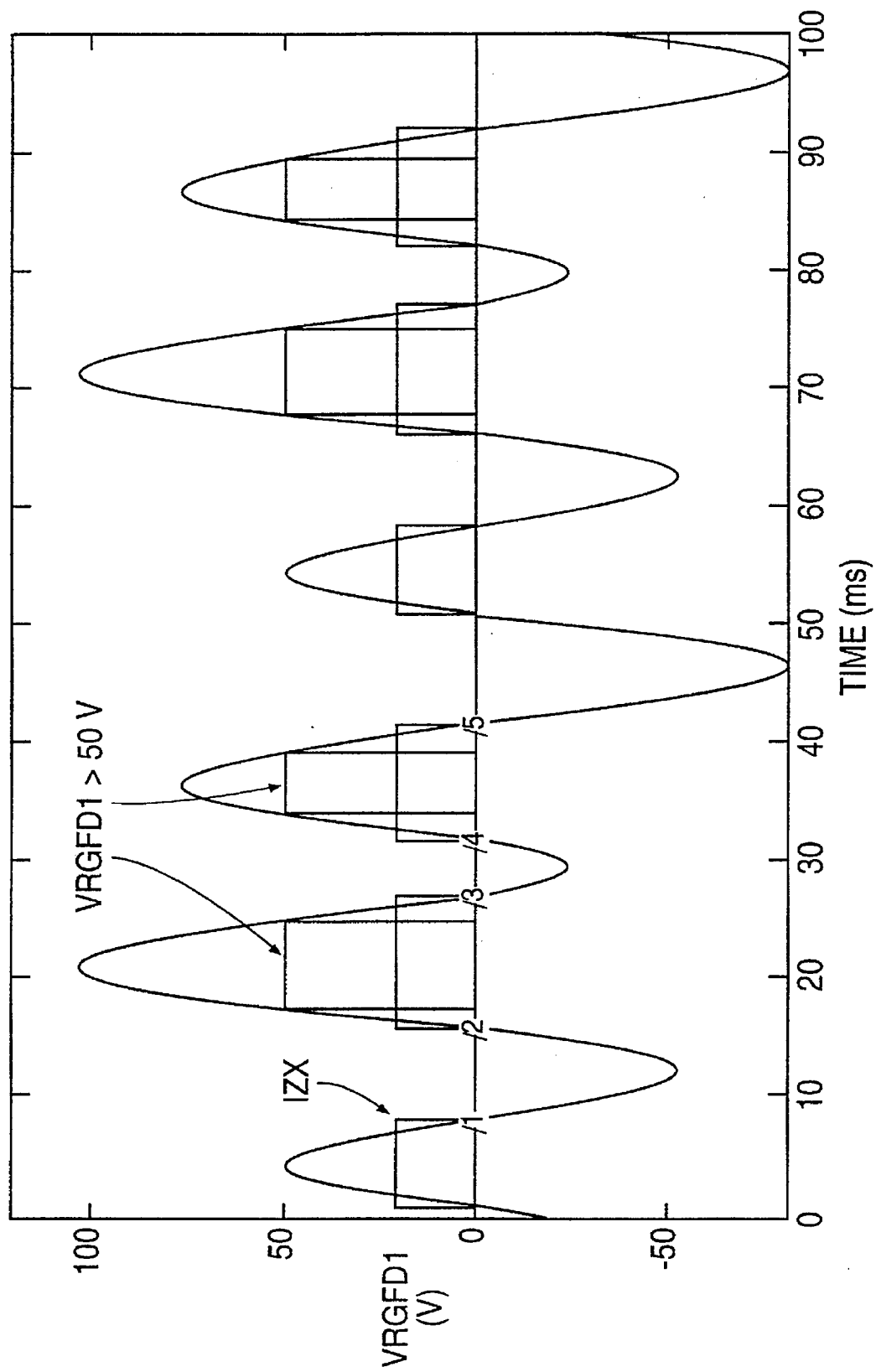

INTEGRATED RING DETECTION CIRCUIT AND POWER CROSS DETECTION CIRCUIT WITH PERSISTENCE TIMERS

BACKGROUND OF THE INVENTION

1. Field of the Invention

The present invention relates to an integrated ring sensor which senses a ringing signal and provides a signal indicating that a telephone is off-hook for both a short-loop condition and a power-cross condition.

2. Background of the Related Art

A terminal connected to a telephone line should periodically undergo a "power-cross" test. This test is performed in order to verify the ability of the terminal to detect the presence of a foreign potential, such as a high voltage of up to 1000 volts AC from a local power company or the like, which may become crossed with the telephone line in an environment outside of the telephone plant. FIG. 1 shows a telephone 10 connected to a telephone plant 12 through wires 14. A power line 16 poses a threat to the telephone plant 12 and any personnel operating telephone equipment that are connected to the wires 14 that are crossed with the power line 16.

The power-cross test typically involves forcing a 1 ampere current into tip and ring lines 18, 20 regardless of the state (i.e., talking, standby or ringing) of those lines, and checking whether the telephone plant 12 survives the test. Generally, in order to provide a 1 ampere current, a 1,000 volt, 60 hertz signal through a 1 kohm resistor is applied to the tip and ring lines 18, 20. Other combinations of voltages and resistance values, such as a 600 volt signal through a 600 ohm resistor, or a 50 volt signal through a 50 ohm resistor, could also be used to obtain the 1 ampere test current.

As mentioned above, the power-cross test is applied regardless of the state of the telephone plant 12. For example, a person could be talking on the telephone 10, or the telephone 10 could be in a standby mode, or the telephone 10 could be ringing and on-hook. Conventionally, during either the talking mode or the standby mode, as shown in FIGS. 1 and 2, a protection device 22, such as a diode or a neon lamp, is connected to ring and tip lines 18, 20 via relays (not shown). When a high voltage, such as an AC power signal, crosses wires 14 (FIG. 1), the current is passed through the protection device 22, thereby preventing damage to the telephone plant 12 or telephone 10.

As shown in FIG. 3, during the ringing mode, the telephone 10 is connected to ground GND via the tip line 18 and relay S1A, and the ring line 20 is connected to a ringer voltage RV by relays S1A, S1B in order to perform the telephone ringing operation. In this situation, the protection device 22 is disconnected. Thus, although protection is provided in the talking and standby modes, there is no protection provided if a power-cross condition occurs during the ringing mode.

Also, when the telephone 10 goes from an on-hook state to an off-hook state while it is ringing (i.e., when the telephone user picks up the handset), there is a need to quickly switch the relays S1A, S1B connecting the ring and tip lines 18, 20 away from the ringing bus, to the protector 22 and SLIC (SLIC not shown in FIG. 3). This switching needs to be done in order that any resistive elements on the ring and tip lines 18, 20 not become damaged due to the high ringing voltage.

SUMMARY OF THE INVENTION

The present invention provides a circuit for quickly detecting a ringing condition of a telephone when the telephone lines are crossed with a high power signal, and to meet the LATA Switching System General Requirements (LSSGR) for both short loop and long loop conditions.

Accordingly, the present invention relates to an apparatus for detecting the presence of an off-hook condition of a telephone connected to a ring line and a tip line when the telephone is in a ringing state and for connecting the telephone to a surge protection circuit when the telephone is in both the off-hook condition and in the ringing state, with the ring line including a ring feed resistor connected on the line.

The apparatus includes a ringing current sensor circuit connected to the ring line and configured to output a first voltage signal when a voltage measured across the ring feed resistor exceeds a predetermined voltage value and to output a second voltage signal indicative of a ringing current. The apparatus also includes a first persistence timer circuit connected to receive the first voltage signal over a first path from the ringing current sensor circuit and to output a first timer signal when the first voltage signal is active for at least a first predetermined amount of time.

The apparatus further includes a digital signal processor connected to receive the second voltage signal over a second path from the ringing current sensor circuit and to output a digital signal indicative of the ringing current. The apparatus still further includes a second persistence timer circuit connected to receive the digital signal from the threshold comparator and to output a second timer signal when the threshold signal is active for at least a second predetermined amount of time.

Additionally, the apparatus includes a logic circuit connected to receive the first and second timer signals and to output a ring trip bit indicative of a ring trip condition when either one of the first or second timer signals is in an active state. With this structure, the apparatus detects both a short loop condition and a power cross condition during ringing.

Also according to the invention is disclosed herein an apparatus for detecting the presence of an off-hook condition of a telephone connected to a ring line and a tip line when the telephone is in a ringing state and for connecting the telephone to a surge protection circuit when the telephone is in both the off-hook condition and in the ringing state, with the ring line including a ring feed resistor connected thereto. The apparatus includes means for determining when a voltage measured across the ring feed resistor exceeds a predetermined voltage value and outputting a first signal indicative thereof. The apparatus also includes means for measuring a loop current flowing across the ring and tip lines and outputting a second signal indicative thereof. The apparatus further includes means for determining if the first signal is in an active state for at least a first predetermined amount of time and outputting a fourth signal indicative thereof. Additionally, the apparatus includes digital signal processing means for processing the second signal and comparing the processed second signal to a predetermined value, and for outputting a third signal when the processed signal exceeds the predetermined value.

The apparatus also includes means for determining if the second signal is in an active state for at least a second predetermined amount of time and outputting a fifth signal indicative thereof. Further, the apparatus according to the invention can include means for outputting a ring trip detection signal when either one of the fourth or fifth signals is in an active state.

There is also described herein according to the invention a method for detecting the presence an off-hook condition of a telephone connected to a ring line and a tip line when the telephone is in a ringing state and for connecting the telephone to a surge protection circuit when the telephone is in both the off-hook condition and in the ringing state, with the ring line including a ring feed resistor connected thereto, and with a first and second sense resistor connected to opposite ends of the ring feed resistor.

The method includes a step of determining if a voltage across the ring feed resistor exceeds a first threshold value and outputting a first signal indicative thereof. The method also includes a step of receiving a first current flowing across the first sense resistor and a second current flowing across the second sense resistor and outputting a second signal indicative of a difference between the first and second currents. The method further includes a step of determining if the first signal is continuously output for at least a first amount of time and outputting a third signal indicative thereof.

Additionally, the method includes a step of filtering the second signal to remove any ringing or high frequency components from the second signal. The method further includes a step of comparing the filtered second signal to a second threshold value and outputting a fourth signal indicative thereof. The method also includes a step of determining if the fourth signal is continuously output for at least a second amount of time and outputting a fifth signal indicative thereof. Even still further, the method includes a step of determining if either one of the fourth or fifth signals is being output, and outputting a ring trip detection signal indicative thereof, with the ring trip detection signal being indicative of the off-hook condition during the ringing state of the telephone.

BRIEF DESCRIPTION OF THE DRAWINGS

For a description of a method and apparatus according to the invention, reference is made to the following description and accompanying drawings, in which:

FIG. 8 shows a diagram of a power cross detection waveform, and the zero crossings used to detect this waveform by the Power Cross Validation Circuit used in the invention.

DETAILED DESCRIPTION OF THE PREFERRED EMBODIMENTS

Figure 1:
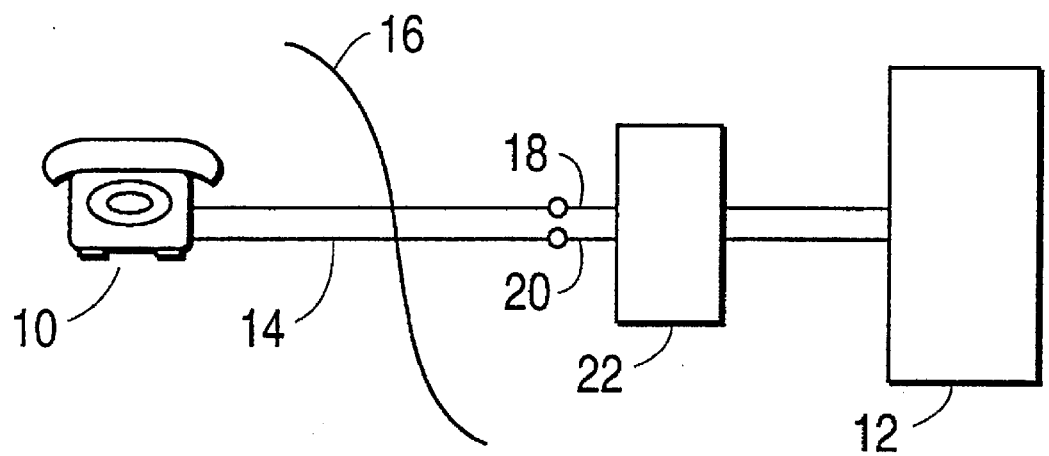
FIG. 1 is a schematic circuit diagram of a typical power-cross test detection circuit.
Figure 2:
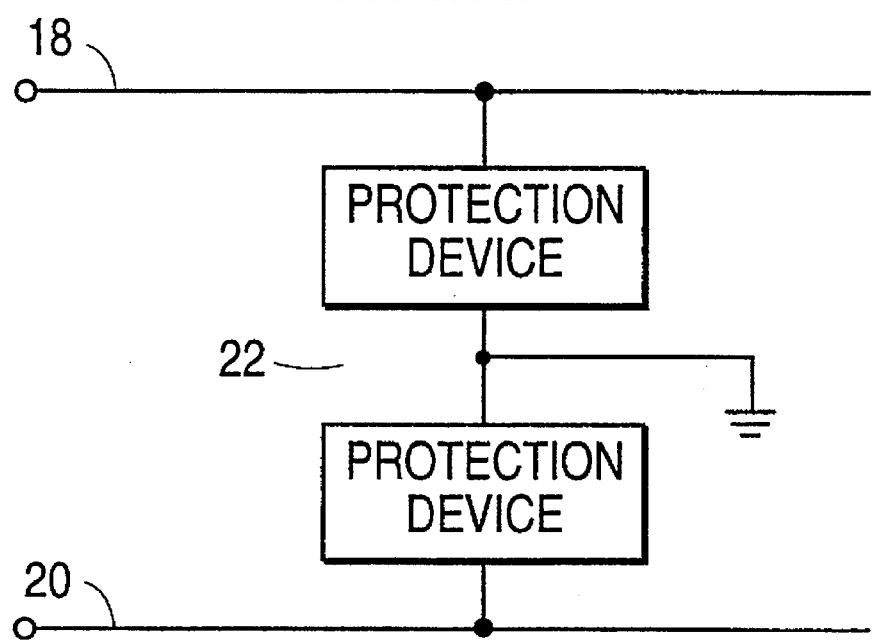
FIG. 2 illustrates the protection device configuration according to the circuit shown in FIG. 1.
Figure 3:
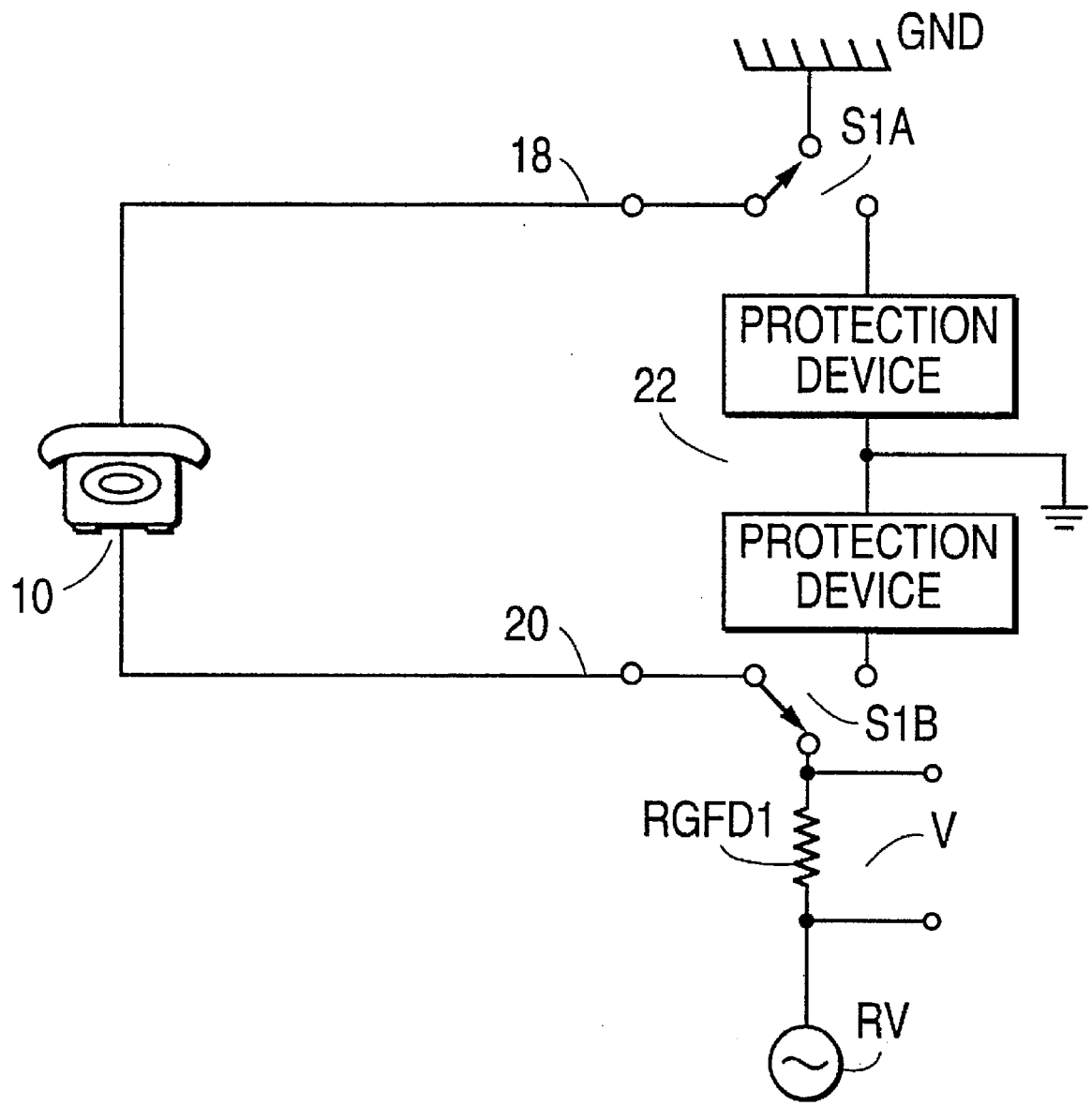
FIG. 3 shows a schematic circuit diagram illustrating the ringing state of the circuit shown in FIG. 1.
Figure 4:
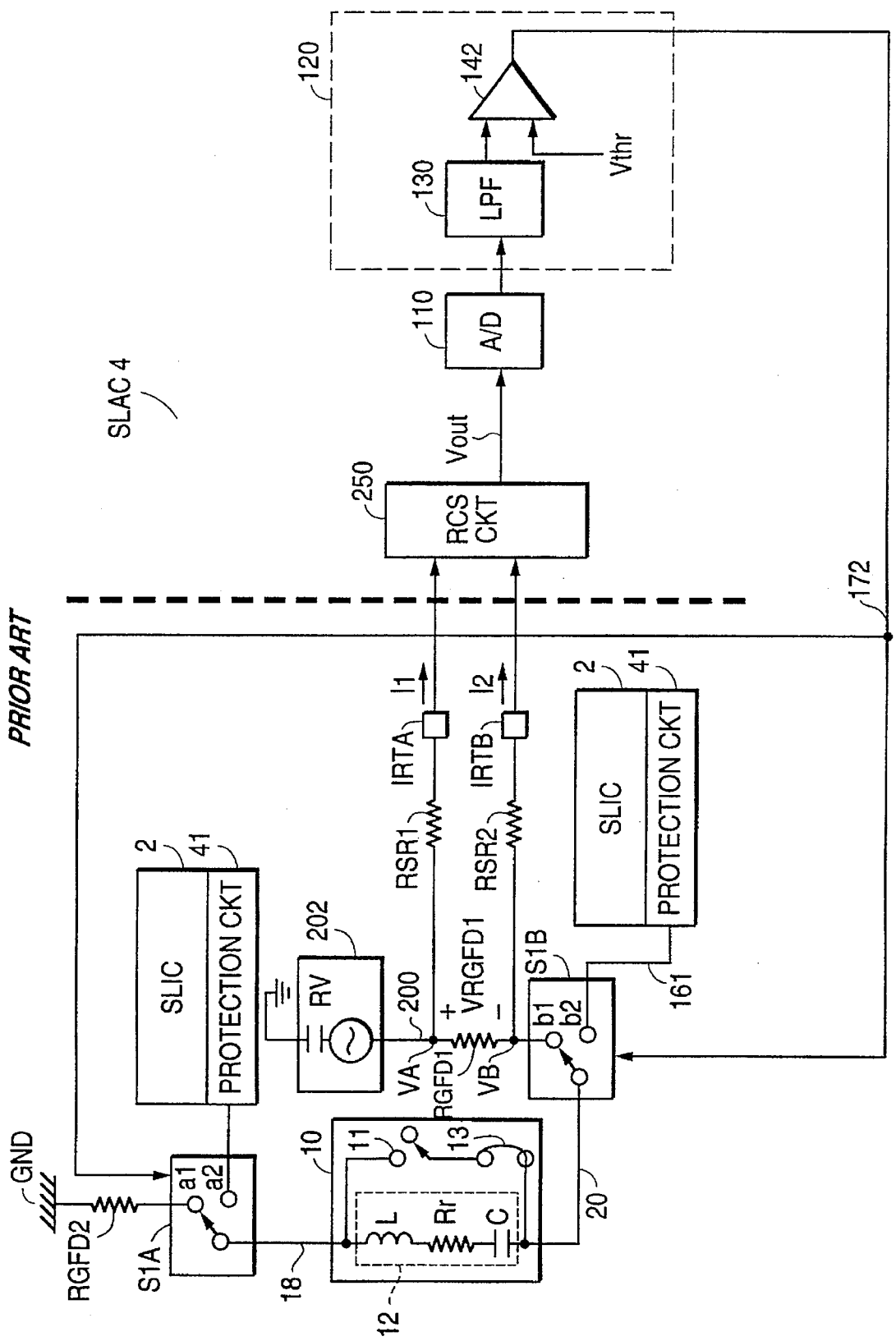
FIG. 4 is a block diagram of a telephone connected to a subscriber line interface circuit (SLIC) and a subscriber line audio processing circuit (SLAC) via ring and tip lines.

Referring now to the drawings, FIG. 4 shows a telephone 10 connected to a subscriber line interface circuit (SLIC) 2 via a ring line 20 and a tip line 18, and a pair of relays S1A and S1B. Also shown in FIG. 4 is a ringing current sensor (RCS) circuit 250, a first ring feed resistor RGFD1 connected between a ring bus 200 and the relay S1B, and a second ring feed resistor RGFD2 connected between the relay S1A and a reference (e.g., ground) potential GND. The RCS circuit 250 is part of a subscriber line audio processing circuit (SLAC) 4.

A pair of sense resistors RSR1 and RSR2 are connected to respective ends of the first ring feed resistor RGFD1. The sense resistors RSR1 and RSR2 are also respectively connected to the two input ports of the RCS circuit 250. The RCS circuit 250 receives a first current I1 flowing across the sense resistor RSR1 and a second current I2 flowing across the sense resistor RSR2, and outputs a voltage $V_{out}$ proportional to the current difference I1–I2. FIG. 4 also shows a ringing generator 202 that is connected to the ring bus 200, in which typically the ringing generator 202 is located at a central exchange or central office. A more detailed description of the RCS circuit 250 is described in an application entitled Integrated Ring Sensor With Fault Detection, U.S. Ser. No. 08/457,668, also assigned to AMD, Inc., in which a PCD circuit 100 corresponds substantially to the RCS circuit 250 of this invention.

The voltage proportional to the current difference I1–I2 is sent to an A/D converter 110, which converts the analog voltage value into a digital (i.e., binary) number. Those of ordinary skill in the art will recognize that the conversion of the current difference I1–I2 to voltage could be eliminated with a current responsive A/D converter while remaining within the scope of the invention. The A/D converter 110 is connected to a Digital Signal Processor (DSP) 120. The DSP 120 includes a low pass filter 130, which removes the 20 Hz AC component from the DC component of the ringing signal. The DSP 120 also includes a comparator 142 for comparing the output of the low pass filter 130 to a threshold voltage value $V_{thr}$. The DSP 120 determines a condition when the DC component of the ringing signal is above the threshold value $V_{thr}$, and outputs a ring trip detection indication on line 172 to the relays S1A, S1B.

According to the invention and as will be described in more detail herein, the output of the DSP 120 is timed in such a way that the DC component of the ringing signal must persist for at least 104 milliseconds before it is actually recognized as a true ring trip occurrence. The primary reason for this persistence check is that the low pass filter 130 of the DSP 120 has a tendency to overshoot when it is subjected to spurious loop closures that last for less than 12 milliseconds. The 104 millisecond persistence check significantly reduces the number of false alarms caused by this low pass filter overshoot condition.

Figure 5:
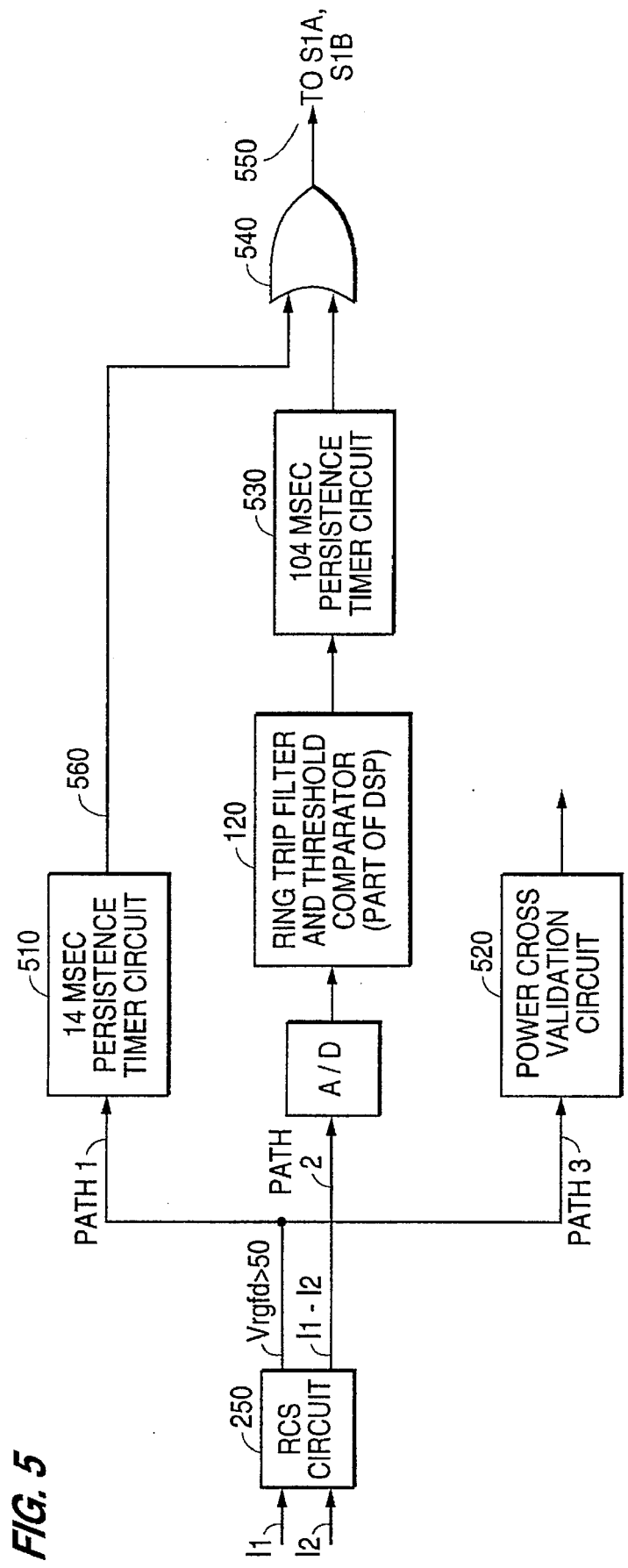
FIG. 5 is a block diagram of the three paths used to detect a ring trip and a power cross condition according to the invention.

FIG. 5 shows a block diagram of the entire power cross detection and short loop detection system according to the invention. The RCS circuit 250 receives a telephone loop current via a pair of sense resistors (not shown in FIG. 5, but see FIG. 4). The RCS circuit 250 detects a condition in which the voltage across the feed resistor RGFD1, $V_{RGFD1}$, (see FIG. 4) is equal to or greater than 50 volts. In this case, RCS circuit 250 outputs a signal indicative of this occurrence to be received by a 14 millisecond persistence timer circuit 510, as indicated by path 1. That signal is also output on a third path (path 3) to be received by a power cross validation circuit 520. The RCS circuit 250 also outputs a signal indicative of the loop current amount (I1–I2). This signal is sent over the second path (path 2) to the A/D converter 110 and then to the DSP 120. The corresponding output of the DSP 120 is received by a 104 millisecond persistence timer circuit 530. Both the 14 millisecond persistence timer circuit 510 and the 104 millisecond persistence timer circuit 530 have their outputs connected to respective input ports of a two-input OR Gate 540. The OR Gate 540 outputs a ring trip detection signal 550, which is used to switch the ring relays S1A, S1B (see FIG. 4) to protect devices on the ring and tip lines 18, 20.

For purposes herein, a short loop condition is one in which a telephone subscriber is relatively close to a central office (e.g., less than ½ mile away) or the total loop resistance is about 700 ohms or less. A long loop condition exists where a telephone subscriber is further away from a central office (e.g., 10 miles away), and the total loop resistance is between about 700 ohms and 2000 ohms or more. AC and DC voltage received from the ringer circuit across the ring feed resistor RGFD1 can be used to detect a ring trip condition if the threshold is set sufficiently high. This is done in path 1, which employs the 14 millisecond persistence timer circuit 510 to detect true short loop ring trip conditions of $V_{RGFD1}>50$ volts. Since ring voltage is attenuated in path 2, the DC component is used. The difference current or a voltage representative thereof is filtered and applied to a 104 millisecond persistence timer circuit 530 to detect a true long loop ring trip condition.

The 104 millisecond persistence timer circuit 530 and the ring trip filter 130 of the DSP 120 introduce a total delay that, for loops less than 700 ohms (i.e., short loops that typically are near the central office or exchange), are below the LSSGR interrupt/trip time requirements as shown for path 1 and path 2 in FIG. 7. These requirements are for safety purposes, and provide a limit on the maximum amount of time that a loop can be connected to the ringing generator 202 at the central office (see FIG. 4) for various levels of peak-to-peak loop ringing current.

Another problem that is addressed by the system according to the invention is the detection of a power cross condition during ringing. For safety reasons, this power cross condition must be rapidly detected to protect both telephone service personnel and the telephone line card in which the SLIC 2 is housed. If the power cross is small enough, its presence will be detected as a DC ring trip signal at the output of the ring trip filter 130 of the DSP 120, and this detection is performed over path 2 of FIG. 5. The ring relay S1B (as shown in FIG. 4) then releases and connects the ring and tip lines 18, 20 to a protection circuit 41 in the SLIC 2. However, a very high power, 60 Hz power cross signal that has come in contact with either or both of the ring and tip lines 18, 20, will most likely overload the A/D converter 110. In this case, the DC component of the ring signal sent on path 2 is masked by the large power cross signal, and there is not enough DC component left to be detected as a ring trip event by the DSP 120.

To eliminate this problem, path 1 and path 3 are included in the system according to the invention as shown in FIG. 5. These additional paths are used for the purpose of rapidly detecting low resistance loop closures while maintaining immunity to spurious loop closures and detecting large power cross conditions.

Figure 7:
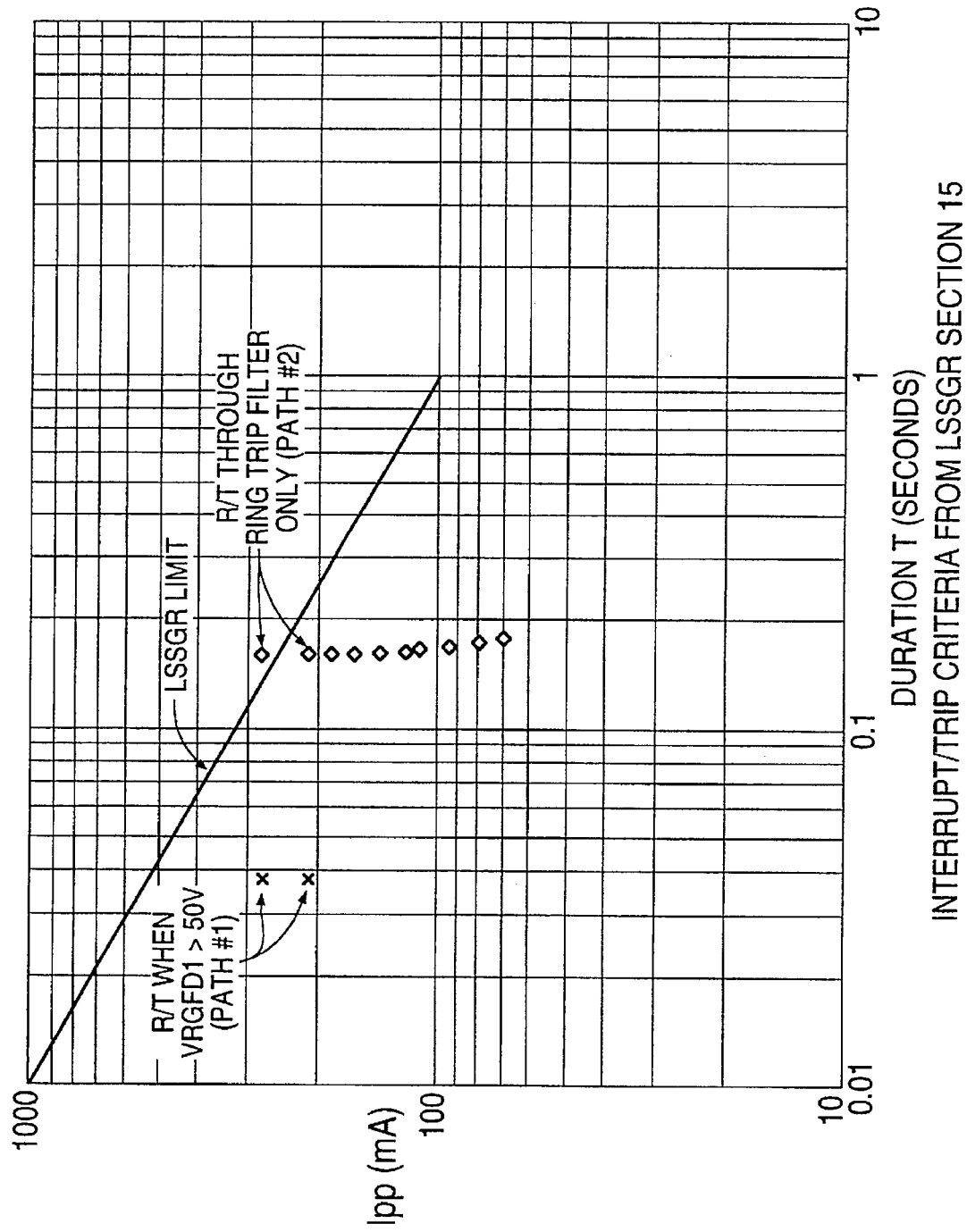
FIG. 7 shows the LATA Switching System General Requirements (LSSGR) that are met by using the system according to the invention.

Path 1 handles the requirement for rapid detection of low resistance loop closures in order to meet the LSSGR interrupt/ring trip specifications given in FIG. 7. The RCS circuit 250 detects when the voltage $V_{REFD1}$ across the first ring feed resistor RGFD1 is greater than 50 volts. In the preferred embodiment, the first ring feed resistor RGFD1 has a resistance that is equal to 510 ohms. Thus, 50 volts measured across the first ring feed resistor RGFD1 represents a 98 milliampere loop current. Of course, the first ring feed resistor RGFD1 can have other resistance values and still be within the scope of the invention as described herein.

A signal indicating that $V_{RGFD1}$ is greater than 50 volts is output from the RCS circuit 250 onto path 1 (and also onto path 3), and is input to the 14 millisecond persistence timer circuit 510. The 14 millisecond persistence timer circuit 510 determines if a signal received at its input is in an active (i.e., logic "1") state for at least 14 milliseconds. The 14 millisecond persistence timer circuit 510 outputs a first timer signal 560 indicative of this condition to a first port of the OR Gate 540. That is, only if the input signal stays at a logical "1" state for at least 14 milliseconds will the 14 millisecond persistence timer circuit 510 output the first timer signal 560 with a logical "1" state. The first timer signal 560 need only be set to the logical "1" state for a short period of time (i.e., a single pulse output by the circuit 510), since the OR Gate 540 will output the ring trip detection signal 550 on its output port based on a "1" being received at one of its two input ports for that short period of time.

The two-input OR Gate 540 is connected to both the 14 millisecond persistence check circuit 510 on path 1 and to the 104 millisecond persistence check circuit 530 on path 2. Based on these two inputs, the OR Gate 540 outputs a ring trip detection signal 550 on its output port. The ring trip detection signal 550 indicates that a ring trip detection has occurred when in an active state (i.e., "1" or high), and it indicates that a ring trip detection has not occurred with an inactive state (i.e., "0" or low). Of course, the system according to the invention can work equally as well with negative logic, in which a logic "0" indicates a ring trip event, for example, using a NOR Gate instead of the OR Gate 540.

Since path 1 bypasses the ring trip filter 130 of the DSP 120 and the 104 millisecond persistence timer circuit 530 on path 2, the 14 millisecond persistence timer circuit 510 is required on path 1 to prevent a 12 millisecond or less loop closure from causing an inadvertent ring trip detection. Path 1, therefore, will not recognize any power crosses that last for less than 14 milliseconds.

The improvement in interrupt performance when a ring trip is initiated through path 1 is illustrated by the x-marks as shown in FIG. 7. For peak-to-peak loop currents greater than 200 milliamps, loop current will be interrupted by a ring trip in less than 40 milliseconds, which is well within the specified requirements of the LSSGR. Path 2 now only causes a ring trip detection for long loops where the loop current is too small to be first detected by way of path 1.

Path 3 is used to handle the power cross recognition function, which determines if a 60 Hz AC signal is received on the ring and tip lines. When a power cross condition occurs, a large 60 Hz power cross signal is superimposed upon a smaller 20 Hz ringing signal. Because the 60 Hz power cross signal is typically much larger in amplitude than the 20 Hz ringing signal, the current zero crossings will occur at about a 60 Hz rate with periods varying from 14 to 24 milliseconds. The primary function of the power cross validation circuit 520 is to detect these zero crossings along with a high voltage condition.

For a valid power cross, the $V_{RGFD1}>50$ volt signal output on the first path should exceed 50 volts for at least a portion of two consecutive periods. This detection is shown in FIG. 8, in which a first zero crossing occurs at time t1, a second zero crossing occurs at time t2, and a third zero crossing occurs at time t3, with the time between the first and third zero crossings (i.e., the high-to-low zero crossings) being between 14 and 24 msec, and with the voltage exceeding 50 volts somewhere in that time. The current zero crossings are determined at times based on a current zero crossing detection signal $I_{zx}$, which is output from the RCS circuit 250, and which is described in more detail later. The power cross validation circuit 520 looks for a second consecutive zero crossing having a 14-24 msec period, and with a voltage exceeding 50 volts somewhere during that period, which is the time period between the times t3 and t5 of FIG. 8.

The apparatus and method of determining the zero crossings of a power cross signal by the power cross validation circuit 520 is fully described in another application, entitled "Protection Circuit for Telephone Systems", U.S. Ser. No. 08/487,999, assigned to AMD, Inc., which is incorporated herein by reference.

Referring back to FIG. 4, when the system according to the invention detects the presence of a high voltage across the first ring feed resistor RGFD1 while the telephone 10 is ringing, it sends commands on line 172 to switch relays S1A and S1B from a state of being connected to the ring bus 200 to a state of being connected to a protection circuit 41. In the system according to the invention, protection circuit 41 is internal to the SLIC 2. This switching of relays S1A and S1B can be performed either automatically or via software commands. That is, the ring trip detection indication that is shown as the output of the OR Gate 540 (of FIG. 5) can also be configured entirely in software, without the need for any logic circuits.

A voltage drop $(V_A-V_B)$ across the first ring feed resistor RGFD1 is proportional to the current flowing in the telephone loop, as seen from FIG. 4. The voltages $V_A$, $V_B$ on either side of the first ring feed resistor RGFD1 are sensed by a pair of sense resistors RSR1, RSR2 that are connected to the RCS circuit 250 via terminals IRTA and IRTB, respectively. As a result, a voltage output from the RCS circuit 250 is proportional to a ringing current flowing in the telephone loop. This output voltage in used by the system according to the invention for performing the ring trip and ring relay release functions at proper instants in time.

During ringing, the A/D converter 110 that is connected to the output of the RCS circuit 250 samples the output voltage at a specified rate, which in one embodiment according to the invention, for example, is set to 4 MHz. The A/D converter 110 also can be configured to perform a decimation function and to output an n-bit word at a rate $f_d$ lower than 4 MHz, such as 8 kHz, with this output received by the DSP 120. The n-bit word is then sampled by the low pass filter 130 internal to the DSP 120 at a particular sampling rate, which is set, for example, to 500 Hz (i.e., 2 millisecond sampling period) in the preferred embodiment. The low pass filter 130 of the DSP 120 removes much of the AC components corresponding to ringing ripple, so that a reliable ring trip can be detected by a threshold comparator 142 internal to the DSP 120.

The RCS circuit 250 detects a DC voltage across the first ring feed resistor RGFD1 equal to or greater than 50 volts. In the preferred embodiment, the first ring feed resistor RGFD1 has an impedance of approximately 510 ohms, which is equivalent to the RCS circuit 250 detecting a loop current of at least 98 milliamperes.

During the ringing state, the relay switch S1A is connected at position a1 to one end of the second ring feed resistor RGFD2. The other end of the second ring feed resistor RGFD2 is connected to the reference potential GND. Also, during the ringing state, switch S1B is connected at position b1 to one end of the first ring feed resistor RGFD1. The other end of the first ring feed resistor RGFD1 is connected to a ring bus 200. The ring bus 200 includes a ring generator 202 operating at a 20 Hz frequency. As stated earlier the ring generator 202 is typically located at the central office or exchange. The ringer voltage RV output by the ring generator 202 typically is set to about 100 volts RMS.

During the ringing state, the ring generator 202 on the ring bus 200 is connected to the ring and tip lines 18, 20 via the relays S1A, S1B being in position a1, b1, respectively. This connection causes current to flow through the first ring feed resistor RGFD1 and through an internal ringing impedance 12 (which includes an inductor L, capacitor C, and resistor Rr) of the telephone 10 at the ringing frequency. When the telephone 10 rings while on-hook, the current flowing through the telephone 10 is almost entirely AC current. Very little DC current flows through the telephone 10, since the telephone 10 has its internal ringing impedance 12 connected in series with the ring and tip line connections when it is on-hook. Any DC current passing through the telephone 10 is collected by the internal ringing impedance 12. Therefore, the current drawn through the internal ringing impedance 12 in the telephone 10 causes current to flow through the first ring feed resistor RGFD1.

When the telephone 10 is picked up and goes off-hook during its ringing state, the internal ringing impedance 12 is shorted out by a switch 11 internal to the telephone 10 which detects the off-hook state, and the telephone handset 13 is then connected across the ring and tip lines 18, 20. The telephone handset 13 has an impedance of about 100 ohms. It is important that the time when the telephone 10 is picked up be quickly detected (i.e., detection of the on-hook to off-hook condition), since the amount of DC current flowing through the first ring feed resistor RGFD1 will have significantly increased.

At this time, if the relays S1A and S1B are not switched away from position a1, b1 that connects to the first and second ring feed resistors RGFD1, RGFD2, respectively, the ring feed resistors RGFD1, RGFD2 are likely to become damaged. The damage results from the telephone 10 shorting out the ring feed resistors RGFD1, RGFD2 across the high voltage source RV of the ring generator 202 on the ring bus 200. The RCS circuit 250 needs to rapidly detect this change from an on-hook condition to an off-hook condition during ringing, typically within 200 milliseconds. According to the invention, ring trip detection can then be used to switch the ring relays S1A, S1B out of the ringing position (i.e., a1, b1) and into a talking position (i.e., a2, b2). When relays S1A and S1B are in the talking position, the first and second ring feed resistors RGFD1, RGFD2 will not be shorted out by the high voltage RV of the ring generator 202 on the ring bus 200.

The system according to the present invention senses the DC and AC currents indicating an off-hook condition and the ringing current indicating an on-hook condition. Using this information, the system according to the invention sorts out the times when the relays S1A and S1B are to be switched over from being connected to the ring feed resistors RGFD1, RGFD2 to being connected to a protection circuit 41 internal to the SLIC 2. Such switching of relays S1A and S1B is activated by a corresponding control signal, which is shown as the output signal 550 of FIG. 5.

FIG. 4 shows the pair of sense resistors RSR1, RSR2 being connected to opposite ends of the ring feed resistor RGFD1. In the preferred embodiment according to the invention, the sense resistors RSR1, RSR2 are both equal to about 750 kohm, but they may be set to any large impedance value with respect to RGFD1, while still remaining within the scope of the invention. When there is little or no current flowing across the first ring feed resistor RGFD1, the currents flowing through both of the sense resistors RSR1, RSR2 are essentially equal. Each of the sense resistors RSR1, RSR2 is connected to a respective input port IRTA, IRTB of the RCS circuit 250.

Figure 6:
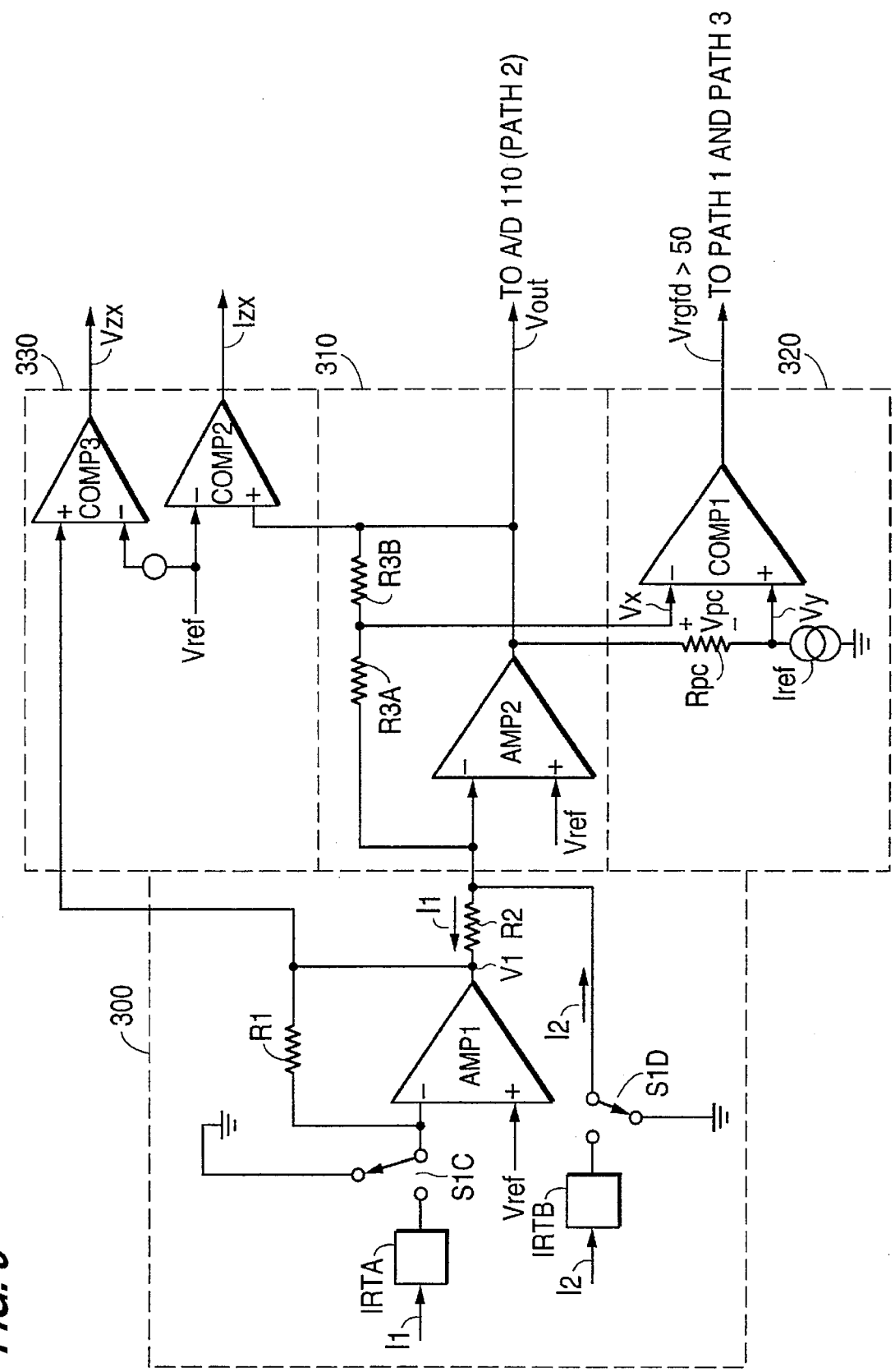
FIG. 6 is a block diagram of the integrated ring sensor circuit according to the invention.

Referring now to FIG. 6, the RCS circuit 250 according to the invention includes a current differencing circuit 300, a current-to-voltage converter circuit 310, and a power-cross circuit 320. The current differencing circuit 300 receives a current $I_1$ flowing through the first sense resistor RSR1, a current $I_2$ flowing through the second sense resistor RSR2, and outputs a current equal to the difference of currents $I_1$ and $I_2$.

When the telephone 10 rings, there is a large amount of AC current flowing through the first ring feed resistor RGFD1, but little or no net DC current flowing through the first ring feed resistor RGFD1. Thus, the DC current component of the output of the current differencing circuit 300 in this case is approximately zero.

However, when the telephone 10 is taken off-hook while in the ringing state, the DC and AC currents increase through the first ring feed resistor RGFD1. The increased currents are due to the internal ringer impedance 12 of the telephone 10 drawing current, as seen in FIG. 4.

The increased current flows through the sense resistors RSR1, RSR2, and results in a voltage $V_A$ at one end of the first ring feed resistor RGFD1 being different from a voltage $V_B$ at the other end of the first ring feed resistor RGFD1. As stated earlier, the condition of $I_1$ being substantially equal to $I_2$ equal is detected by the current differencing circuit 300 during the ringing state when the telephone 10 is on-hook, and it outputs a signal with a zero DC current component to indicate this condition. In this case, the current differencing circuit 300 now outputs a current, the DC component of which is greater than zero volts. Upon going off-hook during ringing, this condition no longer exists since $V_A$ no longer approximates $V_B$. Current differencing circuit 300 also outputs $V_1$ which is proportional to voltage $V_A$.

Referring back to FIG. 6, the current differencing circuit 300 is connected to a current-to-voltage converter circuit 310, in which the current difference $I_1-I_2$ is converted again to a voltage proportional to the current difference $I_1-I_2$; i.e., $V_{out}=k1*(I_1-I_2)$, where k1 is a constant corresponding to the feedback resistance of (R3A+R3B) ohms.

The current-to-voltage converter circuit 310 is connected to provide an input to the A/D converter 110, which converts the analog voltage $V_{out}$ into an n-bit digital signal. Referring back to FIG. 4, the A/D converter 110 outputs the n-bit digital signal to the Digital Signal Processor (DSP) 120, which includes the low pass filter 130 and the threshold comparator 142. The low pass filter 130 receives the n-bit digital signal and filters out any AC components from that signal. The filtered output of the low pass filter 130 is then compared to a ring trip threshold value by using the threshold comparator 142 in order to reliably determine whether a ring trip has occurred.

Referring again to FIG. 6, there is also shown a zero crossing voltage and current detection circuit 330, which can also be utilized in the system according to the invention to switch the ring relays S1A, S1B at appropriate times, and which will be described in more detail hereinbelow.

In the system according to the invention, the low pass filter 130 of the DSP 120 is implemented with a pair of complex poles that provides the high level of filtering required for reliable ring detection. The digital low pass filter 130 can be described by the following transfer function:

$$H(z)=H_2(z)*a_0/(1+a_1*z^{-1}+a_2*z^{-2}),$$

where $a_0=0.00390625$, $a_1=-1.9375$, $a_2=0.941406$, and the sampling rate=500 Hz. Further, $$H_2(z) = \sum_{k=0}^{15} z^{-k}$$

The low pass filter 130 preferably has a 4 Hz cutoff frequency in order to eliminate the ringing, AC signal from being compared at the threshold comparitor 142 with the ring trip threshold voltage $V_{thr}$, as seen in FIG. 4. Of course, other cutoff frequency ranges and transfer functions can be utilized by the low pass filter 130 and still remaining within the scope of the invention. The output of the threshold comparison circuit 140 of the DSP 120 is a primarily-DC signal, which indicates whether a ring trip has occurred. This ring trip occurrence is determined from the logical state of the output of a comparator 142, for example, when a logic "1" is output by the comparator 142. Alternatively, ring trip detection could be determined by a logic "0" output from the comparator 142 using different components (such as an inverter after the comparator 142), as is known to those of ordinary skill in the art.

Referring back to FIG. 6, the first current-to-voltage converter circuit 300 is shown as including a negative feedback amplifier AMP1, which receives the current $I_1$ flowing through the first sense resistor RSR1 at its inverting terminal. A resistor R1 is connected between the output of the amplifier AMP1 and the inverting terminal, and a resistor R2 is connected between the output of the amplifier AMP1 and an inverting terminal of amplifier AMP2. The noninverting terminal of AMP1 is connected to a reference potential $V_{ref}$. In the preferred embodiment, resistors R1 and R2 are both set to 3.4 kohms.

The output of the current differencing circuit 300 is a current equal to the difference between the currents $I_1$ and $I_2$. This "current difference" is fed directly to the current-to-voltage converter circuit 310.

The current-to-voltage converter circuit 310 as shown in FIG. 6 includes a feedback amplifier AMP2, with two resistors R3A, R3B connected in series. In a first embodiment, each resistor R3A, R3B has a resistance value equal to 7.5 kohms. Resistors R3A, R3B are connected in series between the output port of the amplifier AMP2 and the inverting terminal of the amplifier AMP2. A reference voltage $V_{ref}$ is connected to the noninverting terminal of the amplifier AMP2. In the system according to the invention, $V_{ref}$ is set to 2.2 volts, which is a voltage value about halfway between the reference potential (i.e., ground) and a logic "one" potential (i.e., 5 volts). Of course, $V_{ref}$ can be set to any reference voltage between the maximum and minimum allowable voltage while still remaining within the scope of the invention.

The output of the amplifier AMP2 is a voltage $V_{out}$ equal to $(I_1-I_2)*R3A$ volts (where R3A is the resistance value of resistor R3A). As shown in FIG. 6, the power-cross circuit 320 is connected to the current-to-voltage converter circuit 310. Also, the inverting terminal of a comparator COMP1 of the power-cross circuit 320 is connected to a point between the series connection of the resistors R3A, R3B of the current-to-voltage converter circuit 310. The noninverting terminal of the comparator COMP1 is connected to a reference current $I_{ref}$, and to a power-cross resistor Rpc. In the preferred embodiment, Rpc is set to 7.81 kohms, and $I_{ref}$ is set to 64 microamps.

The comparator COMP1 compares the voltage $V_x$ across the resistor R3B to a reference voltage $V_y$ equal to $I_{ref}$ * Rpc, and outputs a logical condition. For example, as shown in FIG. 6, the comparator COMP1 outputs a logic "one" when $(I_1-I_2)$ * R3B > $I_{ref}$ * Rpc. This logic "one" condition indicates that the voltage across the first ring feed resistor RGFD1 has exceeded a particular voltage level, such as 50 volts, for example. Of course, inverse logic can also be used to obtain similar results.

A ring trip is detected at the instant the voltage $V_x$ is less than the reference voltage $V_y$. The power-cross circuit 320 is set up so that the power-cross resistor Rpc can be set for any ring trip value, and is independent of the changes in voltage and current levels at the inverting node of the comparator. The resistor R3A is essentially shared by both the current-to-voltage converter circuit 310 and the power-cross circuit 320, thereby resulting in a savings of the total number of elements needed for the RCS circuit 250.

The output of the comparator COMP1 is a power-cross signal, which indicates that $V_{RGFD1}$ exceeds 50 volts. The power-cross signal is then be input to a power cross validation circuit 520 via path 3 and to a 14 msec persistence timer circuit 510 via path 1, as shown in FIG. 5. By the system according to the invention, a line frequency is computed to determine whether the power-cross, high voltage condition is due to a power line (with typically a 60 Hz frequency), or due to a short-loop ringing condition (with a 20 Hz frequency). The short-loop ringing condition occurs when a telephone of a subscriber close to the main telephone exchange rings, and a relatively high voltage is seen at the main telephone exchange due to this ringing. For these close-in telephones, the total loop resistance is about 700 ohms or less.

Referring back to FIG. 4, if the short-loop ringing condition is detected, then there is no need to set the relays S1A and S1B to the protection circuit 41 of the SLIC 2, since in this case the high voltage detected by the power-cross circuit 320 is not due to a true power-cross condition, but is instead due to a ringing telephone that is relatively close to the telephone plant (or central exchange). This short loop ringing signal will not last very long, and so the 14 millisecond persistence timer circuit 510 will not output a logic "1" value to the OR Gate 540 for a short-loop ringing condition.

A detailed analysis of the operation of the RCS circuit 250 as given in FIG. 6 is described hereinbelow. The current $I_1$ that flows through the first sense resistor RSR1 is connected to the inverting input of the feedback amplifier AMP1 of the current differencing circuit 300. Because of the feedback provided by resistor R1, the inverting input of amplifier AMP1 is held at a reference voltage $V_{ref}$. Since the current $I_1$ cannot flow into the input of amplifier AMP1, it must flow through resistor R1, and thereby creates a voltage shift $V_1$ at the output of amplifier AMP1. This voltage shift $V_1$ is proportional to the loop-to-ground voltage $V_A$ (see FIG. 4), as shown by the following equation:

$$V_1 = -I_1 * R1 = -V_A * (R1/RSR1) \tag{1}$$

Referring back to FIG. 6, if R2=R1, then the current $I_1$ is duplicated in resistor R2. The current $I_1$ flows into the inverting input of amplifier AMP2. Also flowing into the inverting input of amplifier AMP2 is the current $I_2$ which flows in the opposite direction with respect to the current $I_1$. Therefore, the current that flows into amplifier AMP2 is:

$$I_1 - I_2 = (V_A - V_B)/RSR1 = -V_{RGFD1}/RSR1 \tag{2}$$

where $V_{RGFD1}$ is the voltage across the first ring feed resistor RGFD1.

Assuming RSR1=RSR2=RSR, then the output of amplifier AMP2 is:

$$V_{out} = V_{RGFD1} * (R3A + R3B)/RSR \tag{3}$$

As can be seen from equation (3), $V_{out}$ is a voltage that is proportional to the ringing current flowing through the subscriber loop. This voltage is consequently fed to the A/D converter 110, which converts this voltage to a digital signal. The digital signal is then applied to the low pass filter 130 internal to the DSP 120. The DSP 120 removes ripple-related AC components of the ringing signal to provide for an accurate and reliable ring trip detection, by comparing the primarily-DC ringing signal to a DC threshold voltage $V_{thr}$ in the threshold comparison circuit 140.

Since $V_{out}$ is a heavily attenuated version of $V_{RGFD1}$, voltage offsets that build up in amplifiers AMP1, AMP2, and the A/D converter 110 can cause significant errors that may produce false ring trips, or may not allow for detection of an actual ring trip. To prevent this from happening, these errors are calibrated out during the first millisecond or so (about 4 frame cycles) after a ringing command is issued. During the calibration time which occurs immediately after the ringing command is issued, the inputs to amplifiers AMP1 and AMP2 are opened by internal switches S1C and S1D, and the output of the A/D converter 110 is stored in a register (not shown). The opening of switches S1C and S1D results in the input ports IRTA and IRTB being connected to ground. In a preferred embodiment, switches S1C and S1D are metal oxide semiconductor (MOS) switches.

When ringing is started and the ring relays S1A, S1B are activated, the register contents are subtracted from the output of the A/D converter 110, thereby removing any internal offset errors in the SLAC 4.

The output of comparator COMP1 is set to a logic one when $V_{RGFD1}$ is greater than 50 volts. The inverting input of comparator COMP1 is connected to the junction between the resistors R3A, R3B. The voltage, $V_x$, at this junction, is:

$$V_x = V_{RGFD1} * R3A/RSR1 \tag{4}$$

The non-inverting input of comparator COMP1 is connected to $V_{out}$ through power cross resistor Rpc, thereby causing a voltage drop between $V_{out}$ and the voltage $V_y$ at the non-inverting input of comparator COMP1.

Therefore, at the transition point of comparator COMP1 (i.e., the input value at which the output value changes its logic state):

$$V_x = V_{out} - V_{rpc} \tag{5}$$

where $V_{rpc}$ is the voltage across resistor Rpc. Equation (5) can be rewritten as:

$$V_{RGFD1} * R3A/RSR = V_{RGFD1} * (R3A + R3B)/RSR - V_{rpc} \tag{6}$$

Solving for $V_{RGFD1}$:

$$V_{RGFD1} = V_{rpc} * RSR*2/R3A \tag{7}$$

The voltage Vrpc determines the value of $V_{RGFD1}$ at which the output of comparator COMP1 will transition from a logic "zero" to a logic "one". The value of $V_{rpc}$ is:

$$V_{rpc} = I_{ref} * Rpc \qquad (8)$$

Assuming $I_{ref}$=64 microamps and R4=7.81 kohms, then we get $V_{rpc}$=0.5 volts. Assuming RSR=750 kohms and R3A=R3B=7.5 kohms, then the value of $V_{RGFD1}$ at which the output of comparator COMP1 changes from a "zero" to a "one" is:

$$V_{RGFD1} = 0.5 \text{ v} * 750 \text{ kohms}/7.5 \text{ kohms} = 50 \text{ volts}$$

Preferably, comparator COMP1 has a hysteresis built into it, for example, a 10% hysteresis. Then, as $V_{RGFD1}$ decreases to voltages less than 50 volts, comparator COMP1 will transition from a logic "one" to a logic "zero" at approximately 45 volts.

As mentioned earlier, during the ringing state, the SLIC 2 and its associated surge protection circuit 41 are not connected to the ring and tip lines 18, 20, since the ring and tip lines 18, 20 are connected respectively to the ring bus 200 and reference potential GND through the ring feed resistors RGFD1, RGFD2 (i.e. relays S1A, S1B are in positions a1, b1). When the DC component of the difference between the current $I_1$ (flowing across the sense resistor RSR1) and the current $I_2$ (flowing across the sense resistor RSR2) gets large, the system according to the invention detects this condition. Upon detection of this condition, it sends a command to immediately switch the ring relays S1A, S1B from positions a1, b1 to positions a2, b2 if certain other conditions are met (such as determining a 60 Hz or so frequency component in the AC signal).

A current and voltage zero crossing detection circuit 330 is also shown in FIG. 6. Comparators COMP2 and COMP3 respectively determine loop current and loop voltage zero crossings.

The voltage zero crossing waveform $V_{zx}$ is a pulse train that is used to time the closure of the ring relays S1A, S1B as close as possible to the point at which the voltage across the contacts of relays S1A, S1B is zero. That way, there is a reduction in the current surge through the contacts of the ring relays S1A, S1B, thereby extending the life of these components.

The loop voltage zero cross waveform $V_{zx}$ is derived by comparing the voltage $V_1$ output from amplifier AMP1 to the voltage $V_{zxref}$. This comparison is done at comparator COMP3. The loop voltage zero crossings must be referenced to the battery voltage at the central office or exchange (not shown in FIG. 6), because any loop capacitance that is present before the ring relays S1A, S1B close is already charged to a voltage near the central office battery voltage. In the system according to the second embodiment of the invention, $V_{zxref}$ is set to 0.226 volts, and represents a 50 volt central office battery.

$V_{zx}$ is used primarily for determining a time to close the ring relays S1A, S1B to put the ringing signal out onto the subscriber line. This timing is critical since there may be a great deal of capacitance on the subscriber line, and so the timing of closing the relays S1A, S1B is important to reduce this effect. Thus, it is desirable to have the ring relays S1A, S1B close at a voltage zero crossing (corresponding to the output signal $V_{zx}$), thereby limiting the amount of charging current going through the contacts of the ring relays S1A, S1B.

The current zero crossing pulses $I_{zx}$ are used to time the opening of the ring relays S1A, S1B as close as possible to the point at which the current through their contacts is zero. Again, this will extend the life of the relays S1A, S1B by reducing arcing across the contacts caused by loop inductance. The loop current zero crossing pulses are derived by comparing $V_{out}$, which is proportional to the loop current, to $V_{ref}$ by using comparator COMP2. Like comparator COMP1, comparators COMP2 and COMP3 preferably have a hysteresis (e.g., 10%) to make them more immune to noise that may appear on the loop.

Also, the current zero crossings $I_{zx}$ are used by the power cross validation circuit 520 to determine if there is a potential power cross condition due to a period of a signal received on the subscriber line being approximately 60 Hz, as described earlier. That is, every occurrence of $I_{zx}$ corresponds to a time t1–t5 as shown in FIG. 8, and so the occurrences of $I_{zx}$ serve as the start and the end of the 14–24 msec zero crossing check as performed by the power cross validation circuit 520.

The system according to the invention can thus be utilized for different types of telephones having different internal impedances. The condition of $I_1$–$I_2$ being greater than a predetermined value is used to trip the ringing signal coming from the ring bus 200 and switch the relays S1A and S1B away from the ring bus 200 and to a talking position with associated driver circuitry.

While preferred embodiments of the invention has been described herein, modification of the described embodiments may become apparent to those of ordinary skill in the art, following the teachings of the invention, without departing from the scope of the invention as set forth in the appended claims.

What is claimed is:

1. An apparatus for detecting the presence of an off-hook condition of a telephone connected by a first and a second ring relay being in a first state to a ring line and a tip line when said telephone is in a ringing state and for connecting said telephone to a surge protection circuit by switching said first and second ring relays to a second state when said telephone is in both said off-hook condition and in said ringing state, said ring line including a ring feed resistor connected thereto, comprising:

a ringing current sensor circuit connected to said ring line and configured to output a first voltage signal when a voltage measured across said ring feed resistor exceeds a predetermined voltage value and to output a second voltage signal indicative of a ringing current;

a first persistence timer circuit connected to receive said first voltage signal over a first path from said ringing current sensor circuit and to output a first timer signal when said first voltage signal is active for at least a first predetermined amount of time;

a digital signal processor connected to receive said second voltage signal over a second path from said ringing current sensor circuit and to output a digital signal indicative of said ringing current;

a second persistence timer circuit connected to receive said digital signal from said digital signal processor and to output a second timer signal when said digital signal is active for at least a second predetermined amount of time; and a logic circuit connected to receive said first and second timer signals and to output a ring trip bit indicative of a ring trip condition when either one of said first and second timer signals are active, wherein said apparatus detects both a short loop ring trip condition and a long loop ring trip condition.

2. The apparatus as recited in claim 1, wherein said digital signal processor comprises:

a digital low pass filter configured to receive said second voltage signal and to output a filtered signal; and a threshold comparator configured to compare said filtered signal to a predetermined reference voltage and to output a threshold signal when said filtered signal exceed said predetermined reference voltage, wherein said filtered signal corresponds to said digital signal indicative of said ringing current.

3. The apparatus as recited in claim 1, further comprising:

an analog to digital converter connected between said ringing current sensor and said digital signal processor, said analog to digital converter converting said second voltage signal to a digital second voltage signal to be received by said digital signal processor.

4. The apparatus as recited in claim 1, further comprising:

a power cross validation circuit connected to receive said first voltage signal over a third path from said ring current sensor circuit and configured to determine if said first voltage signal is due to a power cross condition by determining a periodicity of said first voltage signal.

5. The apparatus as recited in claim 1, further comprising a first and second relay each having a first state for connecting said telephone to said ring and trip lines and a second state for disconnecting said telephone from said ring and tip lines and for connecting said ring and tip lines to said surge protection circuit, wherein said apparatus is configured to cause said first and second relays to be in said second state upon detection of said power cross condition by said apparatus.

6. The apparatus as recited in claim 1, wherein a first and a second sense resistor are connected to opposite ends of said ring feed resistor, and wherein said ringing current sensor circuit comprises:

a current-to-voltage converter circuit connected to said first and second sense resistors and configured to receive a first current flowing across said first sense resistor and a second current flowing across said second sense resistor, and to output said second voltage signal according to a difference between said first and second currents; and a power cross detection circuit connected to said current-to-voltage converter circuit and configured to determine if said second voltage signal is above a second predetermined voltage value and to output said first voltage signal as a result thereof.

7. The apparatus as recited in claim 6, wherein said ring feed resistor has a resistance equal to about 510 ohms.

8. The apparatus as recited in claim 6, wherein said first and second sense resistors each have a resistance equal to about 710 kohms.

9. The apparatus as recited in claim 6, wherein said ringing current sensor circuit further comprises:

a voltage zero-crossing circuit connected to receive said second voltage signal and configured to determine amplitude zero crossings of said second voltage signal; and a current zero-crossing circuit connected to receive said first and second currents and configured to determine amplitude zero crossings of a difference between said first and second currents, wherein said voltage zero-crossing circuit is used to switch said ring relays from said first state to said second state, and said current zero-crossing circuit is used to switch said ring relays from said second state to said first state upon detection of said ringing state.

10. The apparatus as recited in claim 1, wherein said logic circuit comprises a two-input OR Gate.

11. The apparatus as recited in claim 1, wherein said first predetermined amount of time is equal to about 14 milliseconds, and said second predetermined amount of time is equal to about 104 milliseconds.

12. The apparatus as recited in claim 1, wherein said predetermined voltage value is equal to about 50 volts.

13. An apparatus for detecting the presence of an off-hook condition of a telephone connected to a ring line and a tip line when said telephone is in a ringing state and for connecting said telephone to a surge protection circuit when said telephone is in both said off-hook condition and in said ringing state, said ring line including a ring feed resistor connected thereto, comprising:

means for determining when a voltage measured across said ring feed resistor exceeds a first predetermined voltage value and outputting a first signal indicative thereof;

means for measuring a loop current flowing across said ring and tip lines and outputting a second signal indicative thereof;

means for determining if said first signal is in an active state for at least a first predetermined amount of time and outputting a fourth signal indicative thereof;

digital signal processing means for processing said second signal and comparing said processed second signal to a second predetermined voltage value, and for outputting a third signal when said processed signal exceed said second predetermined voltage value;

means for determining if said second signal is in an active state for at least a second predetermined amount of time and outputting a fifth signal indicative thereof; and means for outputting a ring trip detection signal when either one of said fourth and fifth signals are in an active state.

14. The apparatus as recited in claim 13, wherein said digital signal processing means comprises:

a digital low pass filter configured to receive said second signal and to output a filtered signal; and a threshold comparator configured to compare said filtered signal to a predetermined reference voltage and to output said third signal when said filtered signal exceed said second predetermined voltage value.

15. The apparatus as recited in claim 13, further comprising:

an analog to digital conversion means connected between said means for determining a loop current and said digital signal processing means, said analog to digital converter converting said second signal to a digital signal to be received by said digital signal processing means.

16. The apparatus as recited in claim 13, further comprising:

a power cross validation determining means connected to receive said first signal over a third path from said means for determining when a voltage measured across said ring feed resistor and configured to determine if said first signal is due to a power cross condition by determining a periodicity of said first signal.

17. The apparatus as recited in claim 16, further comprising a first and second relay each having a first state for connecting said telephone to said ring and trip lines and a second state for disconnecting said telephone from said ring and tip lines and for connecting said ring and tip lines to said surge protection circuit, wherein said apparatus is configured to set said first and second relays to said second state upon detection of said power cross condition by said apparatus.

18. A method for detecting the presence an off-hook condition of a telephone connected to a ring line and a tip line when said telephone is in a ringing state and for connecting said telephone to a surge protection circuit when said telephone is in both said off-hook condition and in said ringing state, said ring line including a ring feed resistor connected thereto, and having a first and second sense resistor connected to opposite ends of said ring feed resistor, the method comprising the steps of:

a) determining if a voltage across said ring feed resistor exceeds a first threshold value and outputting a first signal indicative thereof;

b) receiving a first current flowing across said first sense resistor and a second current flowing across said second sense resistor and outputting a second signal indicative of a difference between said first and second currents;

c) determining if said first signal is continuously output for at least a first amount of time and outputting a third signal indicative thereof;

d) filtering said second signal to remove any high frequency components from said second signal;

e) comparing said filtered second signal to a second threshold value and outputting a fourth signal indicative thereof;

f) determining if said fourth signal is continuously output for at least a second amount of time and outputting a fifth signal indicative thereof; and g) determining if either one of said fourth and fifth signals are being output, and outputting a ring trip detection signal indicative thereof, wherein said ring trip detection signal is indicative of said off-hook condition during said ringing state of said telephone.

19. The method as recited in claim 18, further comprising the step of:

h) determining whether amplitude zero crossings of said first signal are at a rate indicative of a power cross signal, and outputting a power cross signal indicative thereof.

20. The method as recited in claim 19, wherein said rate in the step h) is approximately 60 Hz.

* * * * *

UNITED STATES PATENT AND TRADEMARK OFFICE
CERTIFICATE OF CORRECTION

PATENT NO. : 5,636,273
DATED : June 3, 1997
INVENTOR(S) : Walter S. SCHOPFER et al.

It is certified that error appears in the above-identified patent and that said Letters Patent is hereby corrected as shown below:

On the title page, between items:

"[76] and [21]", should read --[73] Assignee: ADVANCED MICRO DEVICES INC.--.

Signed and Sealed this

Thirtieth Day of December, 1997

Attest:

BRUCE LEHMAN

Attesting Officer

Commissioner of Patents and Trademarks